(12) United States Patent
Muller et al.

(10) Patent No.: US 6,753,024 B2
(45) Date of Patent: Jun. 22, 2004

(54) METHOD FOR MAKING A FOOD PRESERVATIVE AND FOR PRESERVING FOOD

(75) Inventors: Wayne S. Muller, Hopkinton, MA (US); Alfred L. Allen, Pascoag, RI (US); Anthony Sikes, Fisldale, MA (US); Andre Senecal, North Smithfield, RI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 60 days.

(21) Appl. No.: 10/105,126

(22) Filed: Mar. 20, 2002

(65) Prior Publication Data

US 2003/0180423 A1 Sep. 25, 2003

(51) Int. Cl.$^7$ ................ A23B 7/155; A23L 3/3463
(52) U.S. Cl. ................ 426/52; 426/335; 426/532; 426/637
(58) Field of Search .................. 426/46, 52, 331, 426/335, 532, 637, 615; 435/253.4, 252.9

(56) References Cited

U.S. PATENT DOCUMENTS

| | | | |
|---|---|---|---|
| 4,477,471 A | 10/1984 | Gonzalez | 426/43 |
| 4,820,529 A | 4/1989 | Uchida et al. | 426/7 |
| 5,002,778 A | 3/1991 | Grant | 426/53 |
| 5,100,905 A | 3/1992 | Hsu | 514/372 |
| 5,217,950 A | 6/1993 | Blackburn et al. | 514/2 |
| 5,753,614 A | 5/1998 | Blackburn et al. | 514/2 |

FOREIGN PATENT DOCUMENTS

JP 67115 * 1/1994

OTHER PUBLICATIONS

"The Potato of the Humid Tropics", Jun. 17, 1999, (www-.botgard.ucla.edu/html/botanytextbooks/economicbotany/Coloc).*

Cooking Basics—online Reference. "All Recipes" Encyclopedia. 1995 (www.allrecipes.com/encyc/terms/P/7978).*

"Info Please" online Encyclopedia, 1994/2000. (www.infoplease.com/ce6/society/AO839455.html).*

* cited by examiner

Primary Examiner—Keith Hendricks
(74) Attorney, Agent, or Firm—Vincent J. Ranucci

(57) ABSTRACT

A method for making a food preservative comprises the steps of removing outer skins of taro corms, cutting the corms into pieces, grinding the pieces of corm to produce ground taro, drying the ground taro, diluting the ground taro with water, cooking the taro and water, inoculating the cooked taro and water with a selected bacteriocin producing bacterium and permitting the taro to ferment, to provide the food preservative.

14 Claims, 2 Drawing Sheets

METHOD FOR MAKING A FOOD PRESERVATIVE AND FOR PRESERVING FOOD

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

This invention relates to preservation of foodstuffs and is directed more particularly to a method for making a food preservative and a method for preserving food.

2. Description of the Prior Art

Taro (*Colocasia esculenta*), a native crop of Hawaii, is known to naturally ferment to produce an end product, poi. In ancient times, poi comprised a large portion of the Hawaiian diet. Today, poi is still sold commercially and consists of a purplish to grayish paste.

It is known that bacteriocins, small anti-microbial peptides that are naturally produced by certain bacteria, that is, food-safe organisms, can inhibit food spoilage by inhibiting the growth of food spoilage/pathogenic bacteria.

It has been discovered that poi can support the growth of bacteria that produce bacteriocin.

Accordingly, there is a need for a method for converting taro to poi in such a manner as to provide for the production of bacteriocin at a high level, and thereby to provide a method for preserving commercial and military foodstuffs.

An object of the invention is, therefore, to provide a method for producing a suitable poi, and a method for preserving foodstuffs.

SUMMARY OF THE INVENTION

With the above and other objects in view, a feature of the present invention is the provision of a method for making a food preservative, the method comprising the steps of removing outer skins of taro corms, cutting the corms into pieces, grinding the pieces of corm to produce ground taro, drying the ground taro, diluting the ground taro with water, cooking the taro and water, inoculating the cooked taro and water with a selected bacteriocin producing bacterium, and permitting the taro to ferment for producing fermented poi, to provide the food preservative.

In accordance with a further feature of the invention, there is provided a method for preserving food, the method comprising the steps of producing fermented poi from taro and placing the fermented poi containing bacteriocin in the food requiring preservation.

The above and other features of the invention, including various novel details of combinations of components and method steps, are more particularly described hereinbelow and pointed out in the claims. It will be understood that the particular methods embodying the invention are described by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 1:
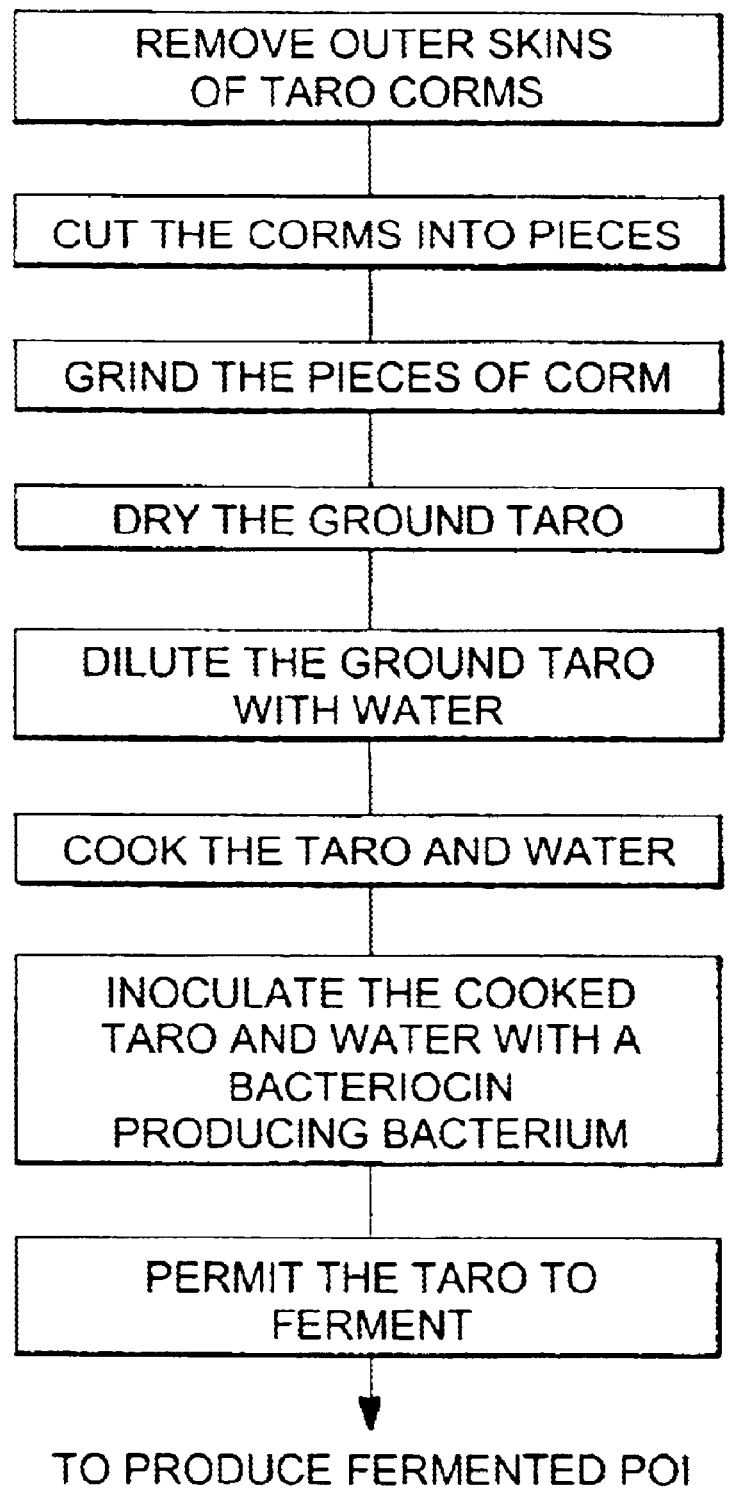
FIG. 1 is a block diagram showing an illustrative embodiment of the method for making a food preservative.
Figure 2:
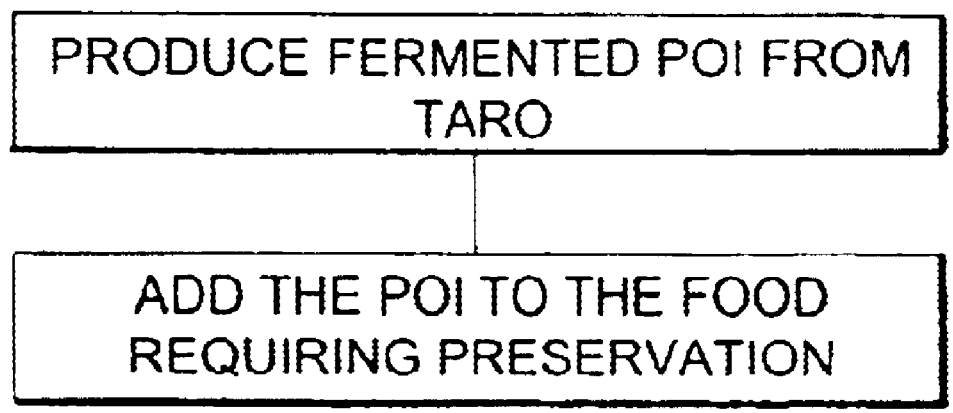
FIG. 2 is a block diagram showing an illustrative embodiment of the method for preserving food.

It has been found that poi is a good growth medium for various lactic acid bacteria that produce bacteriocins. Accordingly, poi can serve as a functional food ingredient for the preservation of various commercial and military foods.

To prepare the poi, the outer skin of taro corms is removed, as by a knife. After the corm is peeled, it is cut into pieces. The corm pieces are then ground, as by a meat grinder. Three passes through the grinder provide sufficient particulation to produce ground taro. The ground taro is then dried. The dried taro is then diluted with water and the taro and water are cooked, as by steaming or autoclaving. The cooked taro and water are then inoculated with a selected bacteriocin producer and allowed to ferment. A suitable bacteriocin producer has been found in *Lactococcus lactis* subspecies *lactis* ATCC 11454.

An analysis of the resulting poi has revealed that the *Lactococcus lactis* subspecies *lactis* ATCC 11454 produces nisin, a bacteriocin that has been FDA approved for use as a food preservative in select foods. The nisin inhibits a test bacteria, *Micrococcus luteus* ATCC 10240, known to cause food spoilage. Thus, the *Lactococcus lactis* subspecies *lactis* ATCC 11454 grows in the taro and produces a bacteriocin therein.

The above-described process has been conducted using another bacteriocin producer, Streptococcus sp. ATCC 10035. In this instance, it has been found that while the taro supports good growth of Streptococcus sp. ATCC 10035, there is no detectable production of bacteriocin and no detectable inhibition of a test bacteria, *Lactobacillus plantarum*. It has been found, however, that adding trypticase or yeast extract to the taro enables the Streptococcus sp. ATCC 10035 to produce bacteriocin. Trypticase is a pancreatic digest of casein that provides to the medium an additional nitrogen source. Yeast extract is a water-soluble portion of autolyzed yeast, providing the medium with a source of naturally occurring B-complex vitamins. Thus, if a bacteriocin is to be produced by Streptococcus sp. ATCC 10035 in taro, a supplement must be added to the medium.

It has been found that the fermented taro, or poi, may be dried without any significant sacrifice in the activity of the bacteriocin produced.

It is to be understood that the present invention is by no means limited to the particular components and method steps herein disclosed and/or shown in the drawings, but also comprises any modification or equivalent within the scope of the claims.

What is claimed is:

1. A method for making a food preservative, the method comprising the steps of:

removing outer skins of taro corms;

cutting the corms into pieces;

grinding the pieces of corm to produce ground taro;

drying the ground taro;

diluting the ground taro with water;

cooking the taro and water;

inoculating the cooked taro and water with a selected bacteriocin-producing bacterium, wherein the bacterium is the bacteriocin producer *Lactococcus lactis* subsp. *lactis* ATCC 11454; and fermenting the taro, to provide the food preservative.

2. The method in accordance with claim 1 wherein the removal of the corm outer skin is accomplished by peeling.

3. The method in accordance with claim 1 including the additional step of adding to the cooked taro and water, along with the selected bacteriocin-producing bacterium, a selected one of a yeast extract or a nitrogen source.

4. The method in accordance with claim 1 wherein cooking of taro corms comprises a selected one of (i) steaming or (ii) autoclaving.

5. A method for preserving food, the method comprising the steps of:
producing fermented poi from taro, wherein producing the poi from taro comprises the steps of:
removing outer skins from taro corms;
cutting the corms into pieces;
grinding the pieces of corm to produce ground taro;
drying the ground taro;
diluting the ground taro with water;
cooking the taro and water;
inoculating the cooked taro and water with a selected bacteriocin-producing bacterium, wherein the bacterium is the bacteriocin producer *Lactococcus lactis* subsp. *lactis* ATCC 11454; and
fermenting the taro, to provide the food preservative; and
placing the poi in food requiring preservation.

6. The method in accordance with claim 5 wherein the removal of the corm outer skin is accomplished by peeling.

7. The method in accordance with claim 5 including the additional step of adding to the cooked taro and water, along with the selected bacteriocin-producing bacterium, a selected one of a yeast extract or a nitrogen source.

8. The method in accordance with claim 5 wherein cooking of taro corms comprises a selected one of (i) steaming or (ii) autoclaving.

9. As a composition of manufacture, a food preservative made in accordance with claim 1.

10. A method for making a food preservative, the method comprising the steps of:
removing outer skins or taro corms;
cutting the corms into pieces;
grinding the pieces of corm to produce ground taro;
drying the ground taro;
diluting the ground taro with water;
cooking the taro and water;
inoculating the cooked taro and water with a selected bacteriocin-producing bacterium, wherein the bacterium is the bacteriocin producer Streptococcus sp. ATCC 10035, and a selected one of a yeast extract or a nitrogen source; and fermenting the taro, to provide the food preservative.

11. A method for making a food preservative, the method comprising the steps of:
preparing cooked taro and water;
inoculating the cooked taro and water with a selected bacteriocin-producing bacterium, wherein the bacterium is the bacteriocin producer *Lactococcus lactis* subsp. *lactis* ATCC 11454; and
fermenting the taro, to provide the food preservative.

12. A method for making a food preservative, the method comprising the steps of:
preparing cooked taro and water;
inoculating the cooked taro and water with a selected bacteriocin-producing bacterium, wherein the bacterium is the bacteriocin producer Streptococcus sp. ATCC 10035, and a selected one of a yeast extract or a nitrogen source; and
fermenting the taro, to provide the food preservative.

13. A food preservative comprising:
fermented ground taro having antimicrobial activity, whereby ground taro is inoculated with the bacteriocin-producing bacterium *Lactococcus lactis* subsp. *lactis* ATCC 11454; and
the inoculated ground taro is fermented to produce said food preservative.

14. A food preservative comprising:
fermented ground taro having antimicrobial activity, whereby ground taro is inoculated with the bacteriocin-producing bacterium Streptococcus sp. ATCC 10035; and a selected one of a yeast extract or a nitrogen source, and
the inoculated ground taro is fermented to produce said food preservative.

* * * * *